Dec. 5, 1933.   C. J. BIVER   1,938,210
THERMIONIC TUBE POWER CONVERTER
Filed Feb. 24, 1932
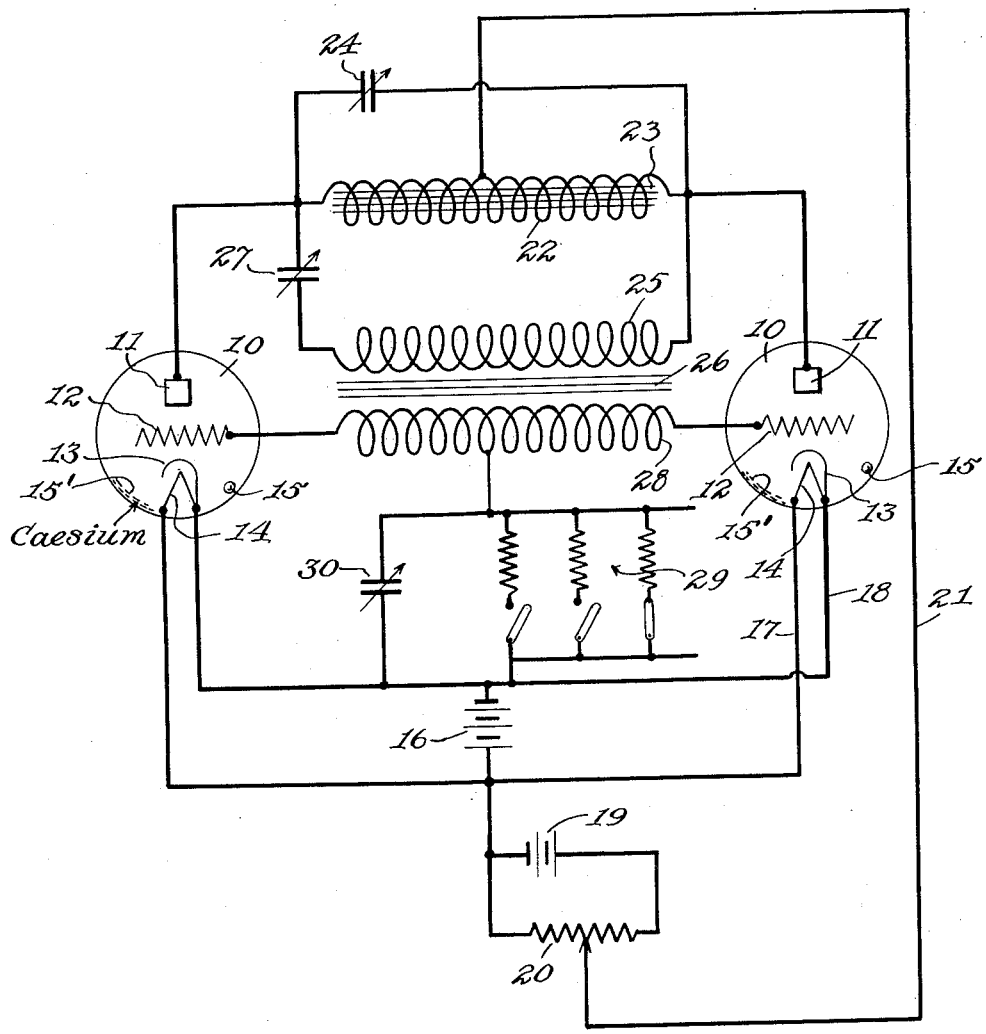
Inventor
Carl John Biver
By Charles W. Hills
Attorney Patented Dec. 5, 1933

1,938,210

UNITED STATES PATENT OFFICE 1,938,210

THERMIONIC TUBE POWER CONVERTER

Carl John Biver, Owensboro, Ky., assignor to The Ken-Rad Corporation, Owensboro, Ky., a corporation of Kentucky Application February 24, 1932. Serial No. 594,938

5 Claims. (Cl. 171—97)

This invention relates to power conversion apparatus of the vapor electric discharge type, and particularly to timing means for interrupting the power delivered to a load circuit.

It is an object of my invention to provide simple means for producing timed interruptions of the load supply of a vapor electric discharge device.

The single figure of the accompanying drawing illustrates schematically an arrangement of instrumentalities employed in carrying out my invention.

As shown in the drawing:

The numerals 10 indicate generally thermionic tubes of the vapor type in which there is present an inert gas, such as a cæsium, and a mercury vapor, and which tubes are generally known as electrostatically controlled arc rectifiers, or more simply as vapor tubes. Such tubes will be hereinafter referred to simply as vapor type tubes.

Each tube has an anode 11, a control grid 12, a cathode 13, and a heater 14. A drop of mercury 15, is placed in the tube to provide a source of mercury vapor in a manner well undertsood in the art, and a quantity of cæsium 15' may be added to provide a source of cæsium vapor. The heater 14 is shown energized by a battery 16, through conductors 17 and 18, and the cathode 13 is connected to the negative terminal of the battery through the conductor 18.

The anode-cathode circuit is energized by a battery 19, and the anode potential is adjusted by a potentiometer 20 connected across the terminals of the battery 19.

It will be obvious that the anode potential may be varied by simply varying the number of cells in the anode battery. While the heater is shown as energized by a battery, it is common knowledge that it may be equally well heated by an alternating current, when the anode and grid circuits are separated from the heater circuit, or, at most, connected to a common ground if the heater circuit is grounded. The battery 19 is connected to the anode 11 of each tube by a conductor 21 connected to the mid-point of a coil 22 of an inductance indicated generally by the numerals 23. The coil 22 is wound on a laminated steel core having a closed magnetic circuit.

The opposite ends of the coil 22 are connected, respectively, to the anodes 11 of the vapor tubes 10. The coil 22 is shunted by a variable condenser 24. The primary 25 of a transformer 26 is connected across the ends of the coil 22 with a blocking condenser 27 in series. The opposite ends of the secondary 28 of the transformer 26 are connected to the grids 12 of the tubes 10 to impress a suitable high potential upon the grids. The direct current load circuit 29 is connected between the mid-point of the secondary 28 of the transformer 26 and the cathode 13 of the tubes, and because of the well known characteristic of the vapor discharge, or arcs, a "full-wave" rectification of the alternating current is obtained in the secondary 28 with consequent flow of a unidirectional current in the load circuit.

It will be evident that in the converter now described the voltage of the direct current supply to the direct current load circuit may be many times that of the voltage of the direct current source.

The manner in which the vapor type tube generates alternating currents because of its coupled anode and grid circuits having inductance and capacitance is now well known in the art. Such tubes have long been used as generators in the radio art, and as rectifiers of alternating currents.

It will be obvious that the converter described is one to convert energy from a low voltage direct current source to supply a high voltage direct current load circuit, making use of the thermionic tube as a generator and as a rectifier with the load supply circuit connected between the grid and cathode of the tube.

It will be evident that the converter is applicable to conditions in which it is desirable that a low voltage supply for electroplating, and the like, be obtained from a high voltage direct current source. It is advantageous to generate alternating currents at relatively high frequencies compared with commercial power supply frequencies. It is evident that the higher the ripple frequency of the unidirectional current the easier it is to filter this direct current supply.

While it is economical to wind the coil 22 of the reactor 23 on a closed core of a suitable quality of steel, it will be understood that the necessary reactance for the generation of currents at desired frequencies may be otherwise obtained with due regard to the energy losses in such reactors occasioned by the current impulses.

The converter just described is described and claimed in a copending application Serial No. 594,936, filed on even date herewith.

I have found that by properly adjusting the capacitance of a condenser 30 connected in parallel with the direct current load circuit the flow of direct current to the load is alternately switched off and on. The value of capacitance necessary to produce a desired frequency of interruption and restoration of the flow of current to the load depends upon the resistance of the load circuit and the frequency of the alternating currents generated by the tubes.

With any given load in the direct current supply circuit, such as a bank of lamps in an electric sign, I have found that it is a simple matter to adjust the capacitance of the condenser to produce flashing of the sign at a predetermined number of times per minute. Thus, by the simple means described I may automatically switch the lights off and on a predetermined number of times per minute without the use of switches having moving mechanical parts.

While I have described my invention in connection with a full-wave converter employing two vapor type tubes, it will be understood that it is also applicable to a converter of the half-wave type, employing a single tube, and which converter is described and claimed in a copending application, Serial No. 594,940, filed on even date herewith.

The embodiment of the invention illustrated and described has been selected for the purpose of clearly setting forth the principles involved.

It will be apparent, however, that the invention is susceptible of being modified to meet the different conditions encountered in its use, and I aim to cover by the appended claims all modifications within the true spirit and scope of my invention.

I claim:

1. In combination, a direct current load circuit, a direct current source, a vapor electric discharge device connected to said source and having a grid connected to said load, means timed to alternately interrupt and restore the supply of current to said load circuit, said means comprising a capacitor connected in parallel with said load circuit cooperable with said grid.

2. In combination, a direct current source, a vapor electric discharge device connected to said source and having a grid and a cathode, a direct current load circuit connected to said grid and said cathode, means timed cooperable with said grid to alternately interrupt and restore the supply of current to said load circuit, said means comprising a capacitor connected to said grid and said cathode.

3. In combination, a vapor electric discharge device having a grid and a cathode, means to impress an alternating potential on said grid, a reactor in series with said grid, a direct current load circuit in the grid-cathode circuit of said device and in series with said reactor, and a capacitor connected in parallel with said load circuit cooperable with said device to produce timed switching of the load circuit.

4. In combination, a vapor electric discharge device having a grid and a cathode, means to impress a pulsating potential on said grid, a reactor in series with said grid, a load circuit connected to said grid and said cathode, and means cooperable with said grid to alternately interrupt and restore the supply of current to said load circuit, said means comprising a capacitor connected to said grid and said load circuit.

5. In combination, a vapor electric discharge device having a plurality of electrodes including an anode, a cathode, and a control grid, electrical energy storing elements connected in circuit association with said electrodes and including means magnetically coupling said anode and said control grid, a load circuit connected to said grid and to said cathode, and capacitor means connected to said grid and to said cathode cooperable with said grid to produce cyclic variations of current flow in said load circuit.

CARL JOHN BIVER.